United States Patent
Tsukada et al.

(10) Patent No.: US 7,954,584 B2
(45) Date of Patent: Jun. 7, 2011

(54) POWER UNIT FOR VEHICLE

(75) Inventors: Yoshiaki Tsukada, Saitama (JP); Tsuyoshi Arima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 854 days.

(21) Appl. No.: 11/976,880

(22) Filed: Oct. 29, 2007

(65) Prior Publication Data

US 2008/0099306 A1    May 1, 2008

(30) Foreign Application Priority Data

Oct. 31, 2006 (JP) ................................. 2006-295252

(51) Int. Cl.
*B62D 61/02* (2006.01)

(52) U.S. Cl. ........ 180/219; 180/226; 180/229; 180/291; 477/114

(58) Field of Classification Search ................. 180/219, 180/226, 229, 230, 291; 477/114, 175
See application file for complete search history.

(56) References Cited

U.S. PATENT DOCUMENTS

| | | | |
|---|---|---|---|
| 6,715,465 B2 * | 4/2004 | Hallam | 123/317 |
| 7,367,923 B2 * | 5/2008 | Zenno et al. | 477/180 |
| 7,575,083 B2 * | 8/2009 | Kosugi et al. | 180/219 |
| 7,665,567 B2 * | 2/2010 | Kosugi | 180/344 |
| 7,757,655 B2 * | 7/2010 | Inui et al. | 123/195 R |
| 2006/0094567 A1 * | 5/2006 | Kosugi et al. | 477/129 |
| 2006/0124372 A1 * | 6/2006 | Ishida et al. | 180/228 |
| 2006/0160660 A1 | 7/2006 | Zenno et al. | |
| 2007/0044744 A1 * | 3/2007 | Kono et al. | 123/90.16 |
| 2007/0144857 A1 * | 6/2007 | Tsukada et al. | 192/48.8 |
| 2007/0251747 A1 * | 11/2007 | Kosugi | 180/230 |

FOREIGN PATENT DOCUMENTS

DE    698 20 004 T2    6/2004
JP    11-222043 A    8/1999

* cited by examiner

*Primary Examiner* — Joanne Silbermann
*Assistant Examiner* — Tashiana Adams
(74) *Attorney, Agent, or Firm* — Birch, Stewart, Kolasch & Birch, LLP

(57) ABSTRACT

A power unit for a vehicle including a clutch capable of making and breaking the transmission of power to a drive wheel. The clutch is interposed in the course of a power transmission path, along which rotational power of a crankshaft is transmitted to the drive wheel. The clutch is rotatably borne on a crankcase, and its axis is set along the front-rear direction of the vehicle. A clutch actuator is provided for controlling the connection and disconnection of the clutch. The clutch actuator mounted to an engine body including the crankcase. This arrangement of the clutch actuator eliminates a need to increase the front-to-rear length of the engine and the vehicle body.

20 Claims, 14 Drawing Sheets

POWER UNIT FOR VEHICLE

CROSS-REFERENCE TO RELATED APPLICATION

The present application claims priority under 35 U.S.C. §119 to Japanese Patent Application No. 2006-295252, filed Oct. 31, 2006, the entire contents of which are hereby incorporated by reference.

BACKGROUND OF THE INVENTION

1. Field of the Invention

The present invention relates to a power unit for a vehicle having a crankcase, a crankshaft rotatably supported to the crankcase while having its axis set along the front-rear direction of the vehicle, a power transmission path for transmitting a rotational drive force of the crankshaft to a drive wheel, a clutch provided in the power transmission path for switching connection and disconnection of the transmission of power, an engine body including the crankcase, and a clutch actuator mounted on the engine body for controlling the switching between an engaged condition and disengaged condition of the clutch.

2. Description of Background Art

Such a power unit for a vehicle as above has already been known, as for example described in Japanese Patent Laid-open No. Hei 11-222043.

However, in the power unit for a vehicle disclosed in Japanese Patent Laid-open No. Hei 11-222043, the clutch actuator is disposed at a rearmost part of the engine body, so that the engine is enlarged in its length in the front-rear direction, and the length of the vehicle in the front-rear direction also tends to be enlarged accordingly. Especially in a longitudinal-type multi-cylinder engine having a crankshaft set along the front-rear direction of the vehicle as disclosed in Japanese Patent Laid-open No. Hei 11-222043, the length of the engine in the front-rear direction is enlarged more.

The present invention has been made in consideration of the above-mentioned circumstances. Accordingly, it is an object of the present invention to provide a power unit for a vehicle in which the increase in the length of the vehicle body in the front-rear direction can be obviated by appropriate layout of a clutch actuator.

SUMMARY AND OBJECTS OF THE INVENTION

In order to attain the above object, according to a first aspect of the present invention, a power unit for a vehicle includes a crankcase, a crankshaft rotatably supported to the crankcase while having its axis set along the front-rear direction of the vehicle, a power transmission path for transmitting a rotational drive force of the crankshaft to a drive wheel, and a clutch provided in the power transmission path for switching connection and disconnection of the transmission of power. An engine body includes the crankcase. In addition, a clutch actuator is mounted on the engine body for controlling the switching between an engaged condition and disengaged condition of the clutch, the clutch actuator being disposed at an upper surface of the engine body.

In addition, according to a second aspect of the present invention, the clutch actuator is disposed at a position for avoiding an intake system connected to the engine body.

According to a third aspect of the present invention, the clutch is contained in a clutch chamber defined by both a rear case constituting a part of the engine body and connected to a rear part of the crankcase and a clutch cover connected to the rear case, and the clutch actuator is disposed at an upper surface of the rear case.

According to a fourth aspect of the present invention, a speed change actuator for controlling a speed change operation of a gear speed change mechanism constituting a part of a transmission provided between the clutch and the drive wheel is disposed at a front surface of the engine body.

According to a fifth aspect of the present invention, the engine body is configured to be of a horizontally opposed type.

Further, according to a sixth aspect of the present invention, the intake system includes a plurality of individual intake pipes connected to the engine body at downstream ends thereof in the state of communicating respectively with a plurality of intake ports provided in the engine body, and a throttle body to which upstream ends of the individual intake pipes are connected in common.

Effects of the invention include the following:

According to the present invention, the clutch actuator is disposed at the upper surface of the engine body. Therefore, it is possible to dispose the clutch actuator by effectively utilizing the space on the upper side of the engine body while obviating increases in the front-rear lengths of the engine and the vehicle body. Particularly, it is possible to obviate the increase in the front-rear length of a longitudinal-type multi-cylinder engine having the crankshaft set along the front-rear direction of the vehicle.

In addition, according to the present invention, the clutch actuator is disposed while avoiding the intake system, whereby it is make possible to effectively utilize the space on the upper side of the engine body. In addition, it is also made possible to ensure that other component parts are not disposed in the vicinity of the clutch actuator, so that the running airflow during running of the vehicle can easily come into contact with the clutch actuator, whereby an enhanced cooling of the clutch actuator can be contrived.

According to the present invention, the clutch actuator is disposed at the upper surface of the rear case which is connected to a rear part of the crankcase so that the clutch chamber for containing the clutch is formed between the rear case and the clutch cover. Therefore, it is possible to shorten the distance between the clutch and the actuator, and to make compact the control force transmission path from the clutch actuator to the clutch.

Further, according to the present invention, it is possible to lay out the clutch actuator and the speed change actuator while effectively utilizing the space existing in the surroundings of the engine body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
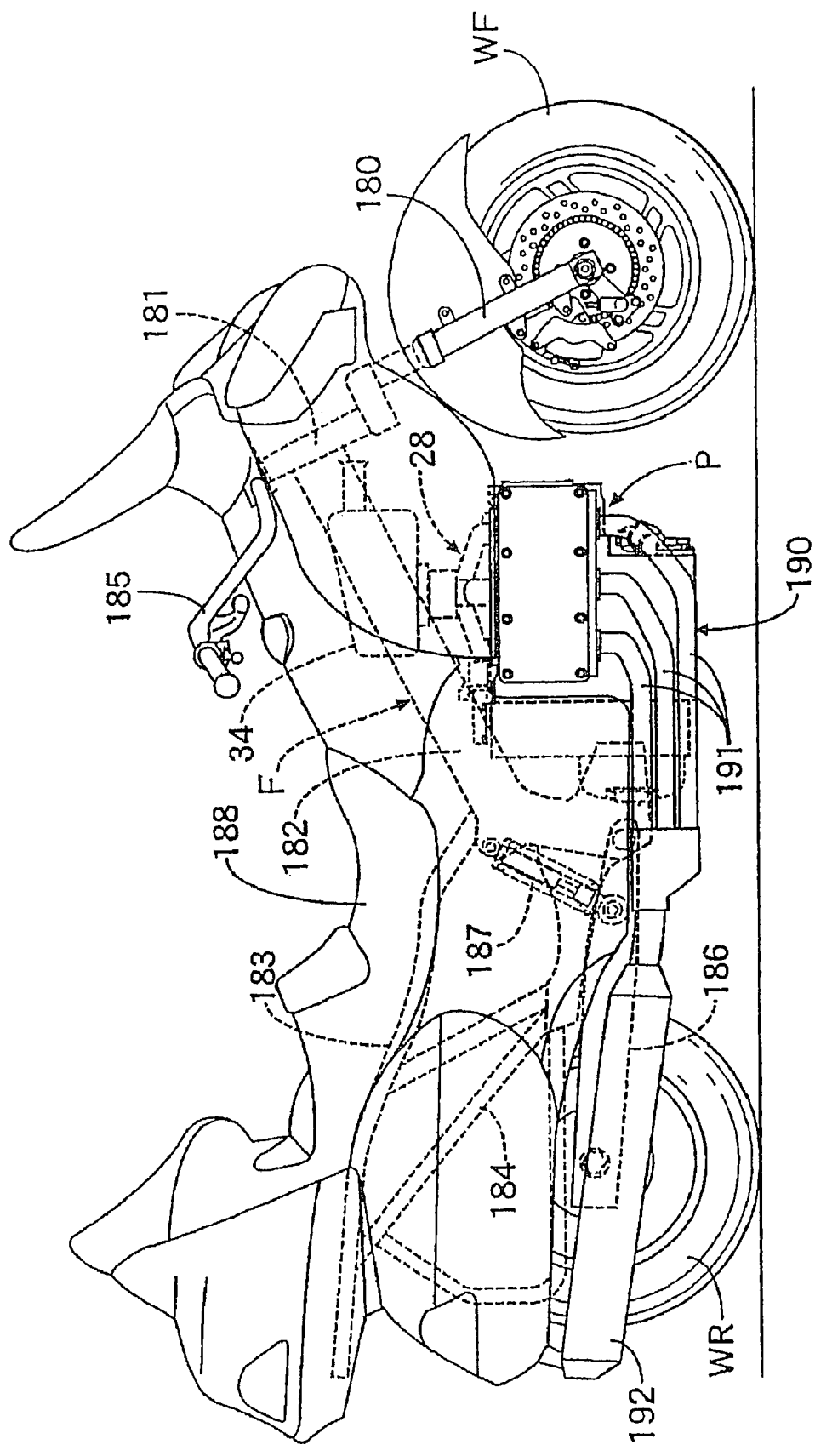
FIG. 1 is a side view of a motorcycle based on a first embodiment of the present invention.

FIGS. 1 to 12 show a first embodiment of the present invention. First, in FIG. 1, a vehicle body frame F of a motorcycle as a vehicle includes a head pipe 181 for steerably supporting a front fork 180 rotatably supporting a front wheel WF, a main frame 182 extending rearwardly downwards from the head pipe 181, seat rails 183 extending rearwardly upwards from upper parts of the rear end of the main frame 182, and back stays 184 for connection between lower parts of the rear end of the main frame 182 and somewhat rear parts of the seat rails 183.

A steering handle 185 is connected to an upper part of the front fork 180. In addition, front end parts of swing arms 186 are vertically swingably borne on rear end parts of the main frame 182, and a rear wheel WR as a drive wheel is rotatably supported by rear end parts of the swing arms 186. Further, rear cushion units 187 are provided between upper parts of the rear end of the main frame 182 and the swing arms 186, and a rider's seat 188 is mounted on the seat rails 183.

A power unit P for driving the rear wheel WR is disposed in the space on the lower side of the main frame 182. The power unit P is supported on the main frame 182 through a plurality of hanger members which are not shown clearly.

In FIGS. 2 to 6, the power unit P is composed of a 4-cycle multi-cylinder (e.g., 6-cylinder) horizontally opposed type engine E and a transmission T for transmitting the power of the engine E through speed change. An engine body 11 of the engine E includes a left engine block 12L disposed on the left side as viewed from a person facing forwards in the running direction of the motorcycle, a right engine block 12R disposed on the right side as viewed from a person facing forwards in the running direction, left and right cylinder heads 13L and 13R connected respectively to both outer ends of the left and right engine blocks 12L and 12R, and a rear case 14 connected to the left and right engine blocks 12L and 12R.

The left engine block 12L has a left cylinder block 15L in which a plurality (for example, three) of cylinder bores 17L . . . are formed side by side, and a left crankcase part 16L formed as one body with the left cylinder block 15L, and the left cylinder head 13L is connected to the left cylinder block 15L so as to form combustion chambers 20L . . . between itself and pistons 18L . . . slidably fitted respectively in the cylinder bores 17L . . . . Similarly, the right engine block 12R has a right cylinder block 15R in which a plurality (for example, three) of cylinder bores 17R . . . are formed side by side, and a right crankcase part 16R formed as one body with the right cylinder block 15R, and the right cylinder head 13R is connected to the right cylinder block 15R so as to form combustion chambers 20R . . . between itself and pistons 18R . . . slidably fitted respectively in the cylinder bores 17R . . . .

Both the engine blocks 12L and 12R are disposed opposite to each other, with the axes of the cylinder bores 17L . . . and 17R . . . set to be substantially horizontal. The left and right crankcase parts 16L and 16R are coupled to each other so that they cooperate with each other in forming a crankcase 21, and the rear case 14 is connected to a rear part of the crankcase 21 along the running direction of the motorcycle.

The pistons 18L . . . and 18R . . . in both the engine blocks 12L and 12R are connected in common to a crankshaft 22 of which one end side is disposed on the front side along the front-rear direction of the motorcycle and which has its axis set along the front-rear direction of the motorcycle, through connecting rods 23L . . . and 23R . . . , and the crankshaft 22 is rotatably supported on the crankcase 21.

Intake ports 24 . . . capable of communicating with the combustion chambers 20L . . . and 20R . . . are provided in side walls of upper parts of the left and right cylinder heads 13L and 13R, and exhaust ports 25 . . . capable of communicating with the combustion chambers 20L . . . and 20R . . . are provided in side walls of lower parts of the left and right cylinder heads 13L and 13R. In addition, intake valves 26 . . . for opening and closing the intake ports 24 . . . and exhaust valves 27 . . . for opening and closing the exhaust ports 25 . . . are disposed in the left and right cylinders 13L and 13R so that they can perform opening and closing operations.

An intake system 28 is connected to side walls of upper parts of the left and right cylinder heads 13L and 13R so as to communicate with the intake ports 24 . . . . The intake system 28 includes: a throttle body 31 disposed on the upper side of the left and right cylinder blocks 15L, 15R while having a pair of intake passages 29L, 29R corresponding individually to the left and right cylinder heads 13L, 13R and having a pair of throttle valves 30L, 30R capable of varying the passage areas of the intake passages 29L, 29R; individual intake pipes 32L . . . which have upstream ends connected in common to the intake passage 29L on one side corresponding to the left cylinder head 13L and which have downstream ends connected to a side wall of an upper part of the left cylinder head 13L so as to communicate individually with the intake ports 24 . . . of the left cylinder head 13L; individual intake pipes 32R . . . which have upstream ends connected in common to the intake passage 29R on one side corresponding to the right cylinder head 13R and which have downstream ends connected to a side wall of an upper part of the right cylinder head 13R so as to communicate individually with the intake port 24 . . . of the right cylinder head 13R; and an air cleaner 34 connected to an upper part of the throttle body 31 so as to communicate with both the intake passages 29L, 29R in common. The upstream ends of the individual intake pipes 32L . . . , 32R . . . are integrally collectively connected to the throttle body 31.

Figure 2:
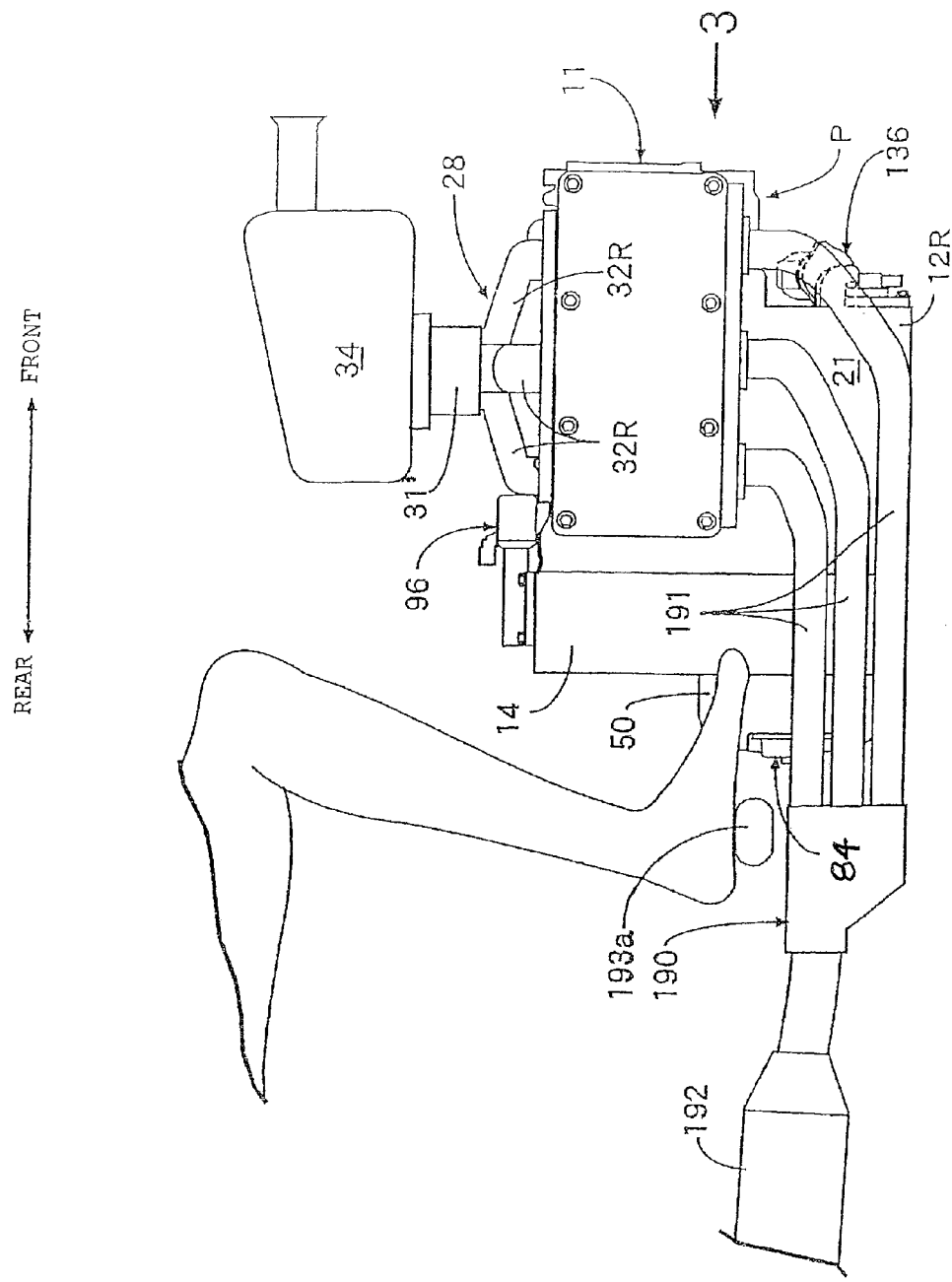
FIG. 2 is an enlarged side view of the vicinity of a power unit in the motorcycle.
Figure 3:
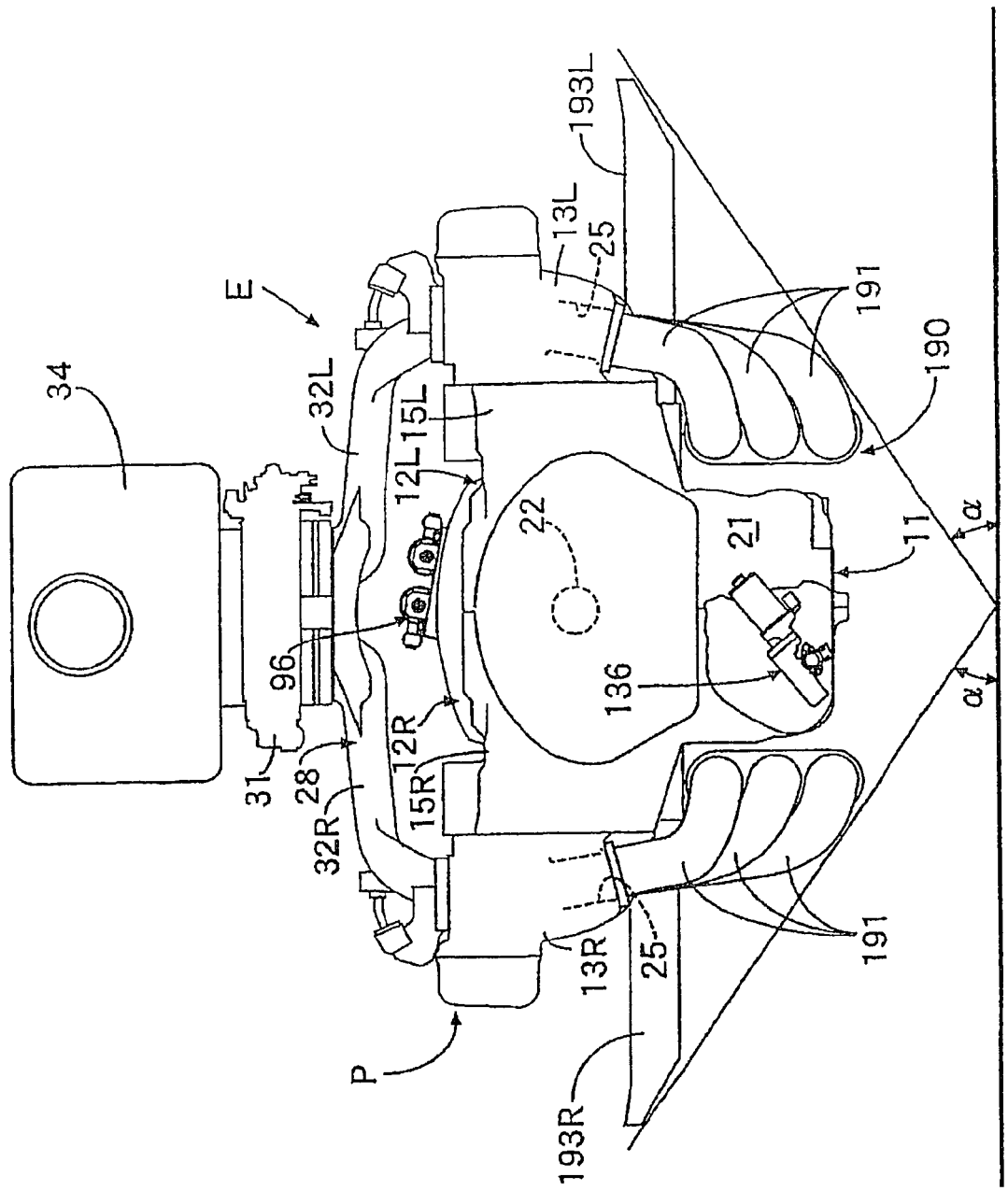
FIG. 3 is a front view taken along arrow 3 of FIG. 2.
Figure 4:
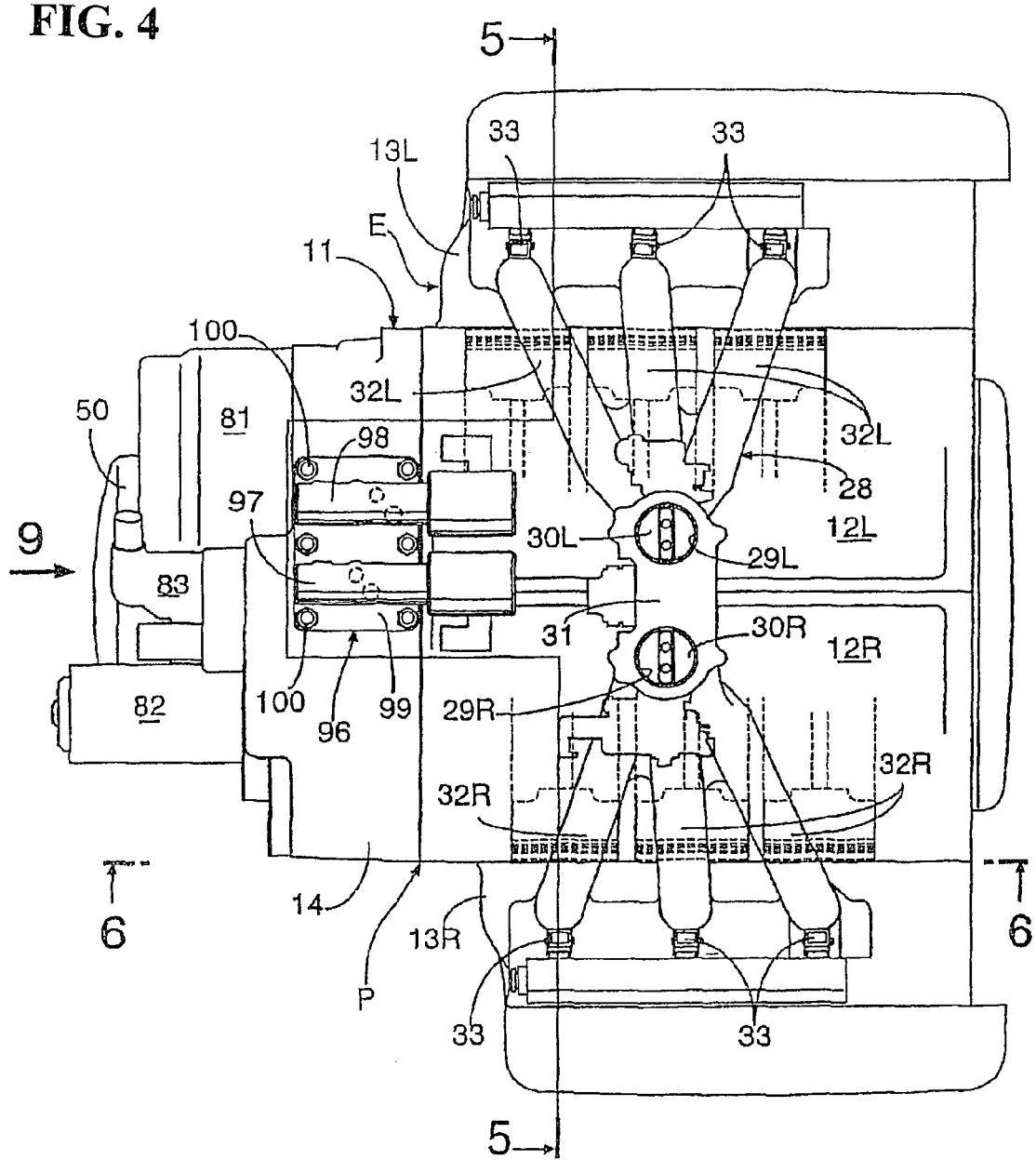
FIG. 4 is a plan view of the power unit.

As shown in FIGS. 1 to 3, an exhaust system 190 is connected to side walls of lower parts of the left and right cylinder heads 13L and 13R. The exhaust system 190 includes individual exhaust pipes 191 . . . connected individually to the lower part side walls of the left and right cylinder heads 13L, 13R so as to communicate individually to the exhaust ports 25 . . . of the left and right cylinder heads 13L, 13R and extending rearwards on lateral sides of the crankcase 21, and exhaust mufflers 192 . . . connected to the individual exhaust pipes 191 . . . and disposed on both sides of the rear wheel WR.

In addition, as shown in FIGS. 2 and 3, steps 193L, 193R on which to mount the rider's left and right feet are attached to the vehicle body frame F so as to bulge to the left and right sides at rear lower parts of the left and right cylinder heads 13L, 13R of the engine body 11. Thus, the bank angle α of the motorcycle is determined by the individual exhaust pipes 191 . . . or the steps 193L, 193R which are present on both sides of the engine body 11.

Figure 7:
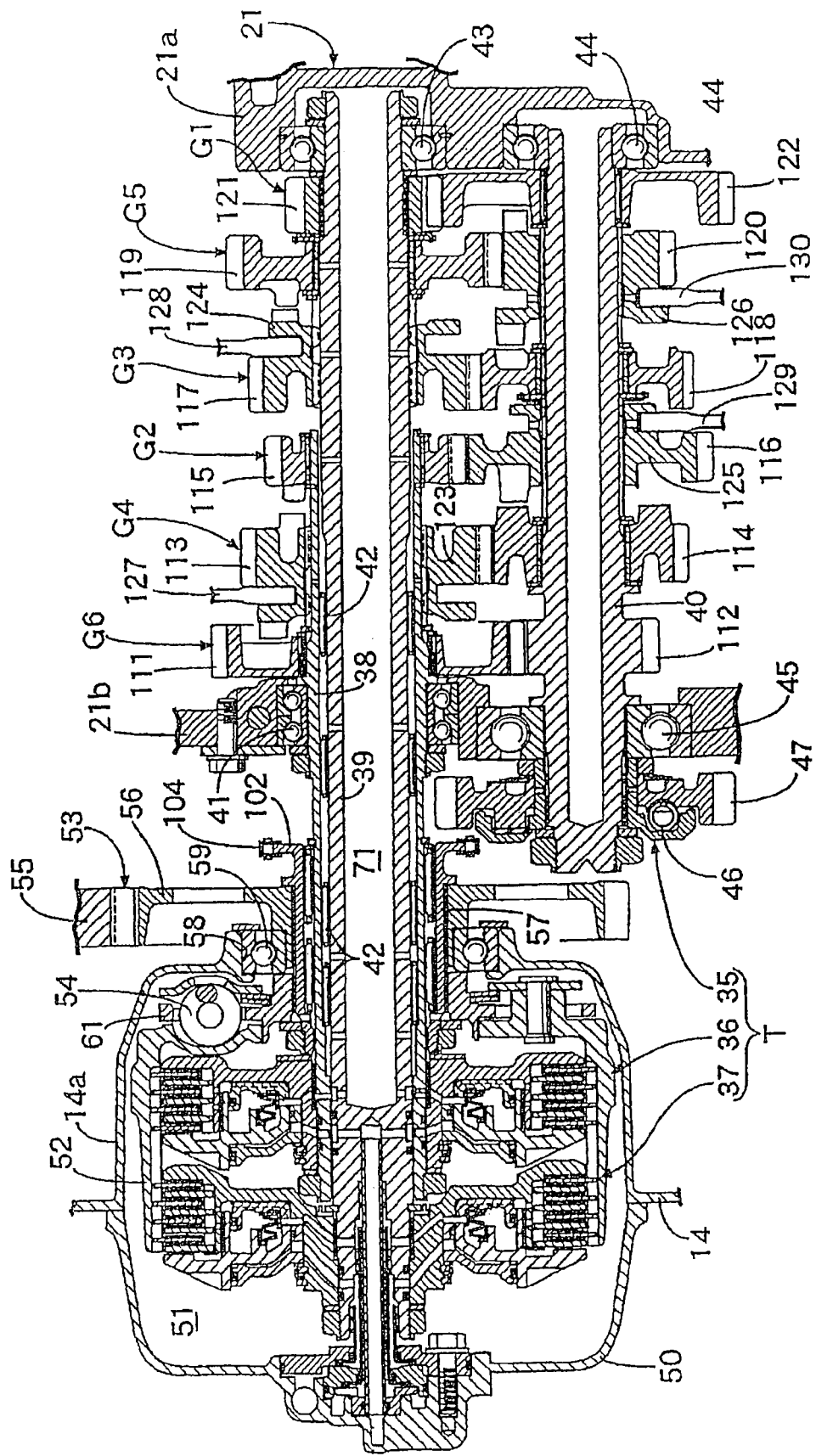
FIG. 7 is an enlarged sectional view taken along line 7-7 of FIG. 6.

In FIG. 7, the transmission T includes a gear speed change mechanism 35, and first and second clutches 36, 37 provided between the gear speed change mechanism 35 and the crankshaft 22. The first and second clutches 36, 37 for switching connection and disconnection of the transmission of power according to the action and release of a hydraulic pressure are interposed in the course of a power transmission path for transmitting the rotational power of the crankshaft 22 to the rear wheel WR.

The gear speed change mechanism 35 is contained in the crankcase 21 while having a plurality of speed change stages of gear trains capable of being selectively established, for example, 1st-speed to 6th-speed gear trains G1, G2, G3, G4, G5, G6. The gear speed change mechanism 35 has a configuration in which the 2nd-speed, 4th-speed and 6th-speed gear trains G2, G4, G6 are provided between a first main shaft 38 and a counter shaft 40, while the 1st-speed, 3rd-speed and 5th-speed gear trains G1, G3, G5 are provided between a second main shaft 39, which penetrates the first main shaft 38 coaxially and relatively rotatably, and the counter shaft 40.

The crankcase 21 includes a pair of front and rear side walls 21a, 21b opposed to each other while being spaced in a direction along the axis of the crankshaft 22, namely, in the front-rear direction of the motorcycle. An intermediate part of the first main shaft 38 formed in a hollow cylindrical shape with an axis parallel to the crankshaft 22 penetrates the rear side wall 21b in a rotatable manner, and a ball bearing 41 is interposed between the rear side wall 21b and the first main shaft 38. In addition, the second main shaft 39 having an axis parallel to the crankshaft 22 penetrates the first main shaft 38 in a relatively rotatable manner in the condition where the relative positions of the first main shaft 38 and the second main shaft 39 in the axial direction are constant. A plurality of needle bearings 42 . . . are interposed between the first main shaft 38 and the second main shaft 39. Besides, one end part of the second main shaft 39 is rotatably borne on the front side wall 21a of the crankcase 21 through a ball bearing 43.

One end part of the counter shaft 40 having an axis parallel to the crankshaft 22 is rotatably borne on the front side wall 21a through a ball bearing 44, whereas the other end part of the counter shaft 40 penetrates the rear side wall 21b in a rotatable manner, with a ball bearing 45 interposed between the other end part and the rear side wall 21b. A gear 47 is mounted to an end part, protruding from the rear side wall 21b, of the counter shaft 40, with a damper spring 46 interposed therebetween.

A drive shaft 48 (see FIG. 5) having an axis parallel to the counter shaft 40 extends rearward while rotatably penetrating the rear case 14 so as to transmit power to the side of the rear wheel WR (not shown), and the gear speed change mechanism inclusive of the gear 47 is provided between the counter shaft 40 and the drive shaft 48.

Figure 8:
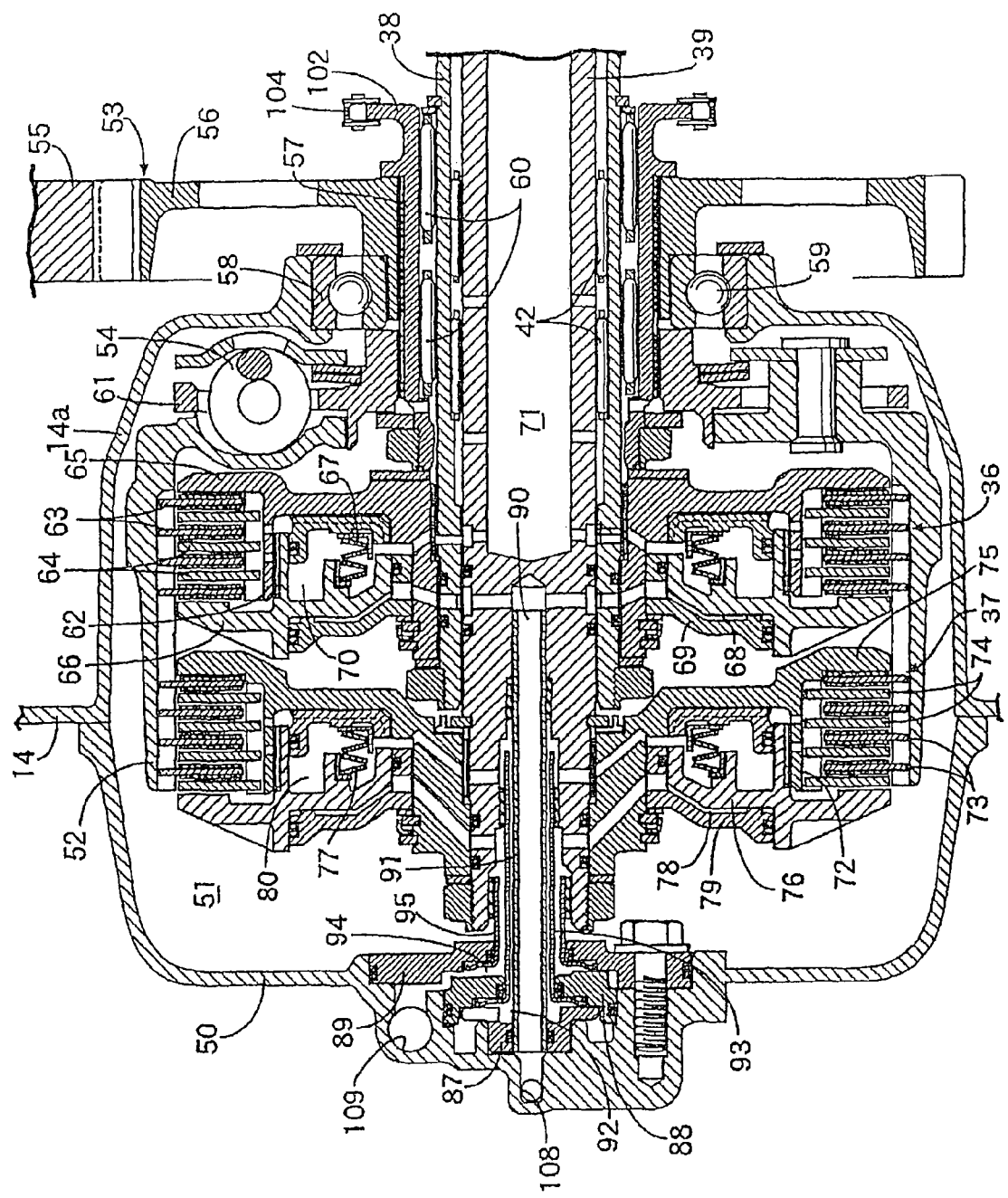
FIG. 8 is an enlarged view of an essential part of FIG. 7.

Referring to FIG. 8 also, the rear case 14 is integrally provided with a containing tube part 14a recessed in a dish-like shape toward the front side. A clutch cover 50 is connected to the rear case 14 in the manner of closing a rear end opening of the containing tube part 14a, and the first and second clutches 36, 37 are contained in a clutch chamber 51 formed between the rear case 14 and the clutch cover 50.

The first clutch 36 is provided at a rear part of the main shaft 38, and the second clutch 37 is provided at a rear part of the second main shaft 39. The power from the crankshaft 22 is inputted through a primary reduction gear 53 and a damper spring 54 to a clutch outer 52 provided in common for the first and second clutches 36, 37. The primary reduction gear 53 includes a drive gear 55 provided on the crankshaft 22, and a driven gear 56 meshed with the drive gear 55. The driven gear 56 is connected to the clutch outer 52 through the damper spring 54.

The containing tube part 14a of the rear case 14 is provided at its front end with a support hole 58 through which to coaxially pass the first and second main shaft 38, 39 and through which to pass a transmission tubular shaft 57 surrounding coaxially the first main shaft 38. A ball bearing 59 is interposed between the driven gear 56, which is relatively non-rotatably connected to the transmission tubular shaft 57, and the inner periphery of the support hole 58. A plurality of needle bearings 60 . . . are interposed between the transmission tubular shaft 57 and the first main shaft 38. In addition, a transmission member 61 is relatively non-rotatably connected to the transmission tubular shaft 57, and the transmission member 61 is connected to the clutch outer 52 through the damper spring 54.

The first clutch 36 includes: the clutch outer 52; a first clutch inner 62 coaxially surrounded by the clutch outer 52 and relatively non-rotatably connected to the first main shaft 38; a plurality of first friction disks 63 . . . relatively non-rotatably engaged with the clutch outer 52; a plurality of second friction disks 64 . . . relatively non-rotatably engaged with the first clutch inner 62 and disposed alternately with the first friction disks 63 . . . ; a first pressure-receiving plate 65 provided on the first clutch inner 62 oppositely to the first and second friction disks 63 . . . , 64 . . . stacked on each other; a first piston 66 clamping the first and second friction disks 63 . . . and 64 . . . between itself and the first pressure-receiving plate 65; and a first spring 67 energizing the first piston 66.

An end wall member 69 for forming a first oil pressure chamber 68 (on which the back surface of the first piston 66 fronts) between itself and the first piston 66 is disposed fixedly on the first clutch inner 62. As the oil pressure in the first oil pressure chamber 68 increases, the first piston 66 operates so as to clamp more firmly the first and second friction disks 63 . . . and 64 . . . between itself and the first pressure-receiving plate 65, whereby the first clutch 36 is put into a connected condition in which the power transmitted from the crankshaft 22 to the clutch outer 52 is transmitted to the first main shaft 38. In addition, a first canceller chamber 70 on which the front surface of the first piston 66 fronts is formed between the first clutch inner 62 and the first piston 66, and the first spring 67 is contained in the first canceller chamber 70 so as to display a spring force toward the side of reducing the internal volume (capacity) of the first oil pressure chamber 68.

Moreover, the first canceller chamber 70 communicates with a first oil passage 71 provided coaxially with the second main shaft 39 for the purpose of supplying a lubricating oil to the lubricated parts of the gear speed change mechanism 35 and to the area between the first and second main shafts 38, 39. Therefore, even when a centrifugal force attendant on rotation is exerted on the oil in the first oil pressure chamber 68 in a decompressed condition and a force for pushing the first piston 66 is thereby generated, a centrifugal force is similarly exerted also on the oil in the first canceller chamber 70, so that the condition where the first piston 66 is undesirably moved toward the side of firmly clamping the first and second friction disks 63 . . . and 64 . . . between itself and the first pressure-receiving plate 65 is obviated.

The second clutch 37 is disposed to be aligned with the first clutch 36 in a direction along the axis of the second main shaft 39 in the manner of clamping the first clutch 36 between itself and the primary reduction gear 53. The second clutch 37 includes: the clutch outer 52; a second clutch inner 72 coaxially surrounded by the clutch outer 52 and relatively non-rotatably connected to the second main shaft 39; a plurality of third friction disks 73 . . . relatively non-rotatably engaged with the clutch outer 52; a plurality of fourth friction disks 74 . . . relatively non-rotatably engaged with the second clutch inner 72 and disposed alternately with the third friction disks 73 . . . ; a second pressure-receiving plate 75 provided on the second clutch inner 72 oppositely to the third and fourth friction disks 73 . . . , 74 . . . stacked on each other; a second piston 76 disposed to clamp the third and fourth friction disks 73 . . . , 74 . . . between itself and the second pressure-receiving plate 75; and a second spring 77 energizing the second piston 76.

An end wall member 79 forming a second oil pressure chamber 78 (on which the back surface of the second piston 76 fronts) between itself and the second piston 76 is disposed fixedly on the second clutch inner 72. As the oil pressure in the second oil pressure chamber 78 increases, the second piston 76 operates so as to more firmly clamp the third and fourth friction disks 73 . . . , 74 . . . between itself and the second pressure-receiving plate 75, whereby the second clutch 37 is put into a connected condition in which the power transmitted from the crankshaft 22 to the clutch outer 52 is transmitted to the second main shaft 39. In addition, a second canceller chamber 80 on which the front surface of the second piston 76 fronts is formed between the second clutch inner 72 and the second piston 76, and the second spring 77 is contained in the second canceller chamber 80 so as to display a spring force toward the side of reducing the internal volume (capacity) of the second oil pressure chamber 78.

A second oil passage 92 described later communicates with the second canceller chamber 80. Therefore, even when a centrifugal force attendant on rotation is exerted on the oil in the second oil pressure chamber 78 in a decompressed condition and a force of pushing the second piston 76 is thereby generated, a centrifugal force is similarly exerted also on the oil in the second canceller chamber 80, so that the condition in which the second piston 76 is undesirably moved toward the side of firmly clamping the third and fourth friction disks 73 . . . , 74 . . . between itself and the second pressure-receiving plate 75 is obviated.

Figure 9:
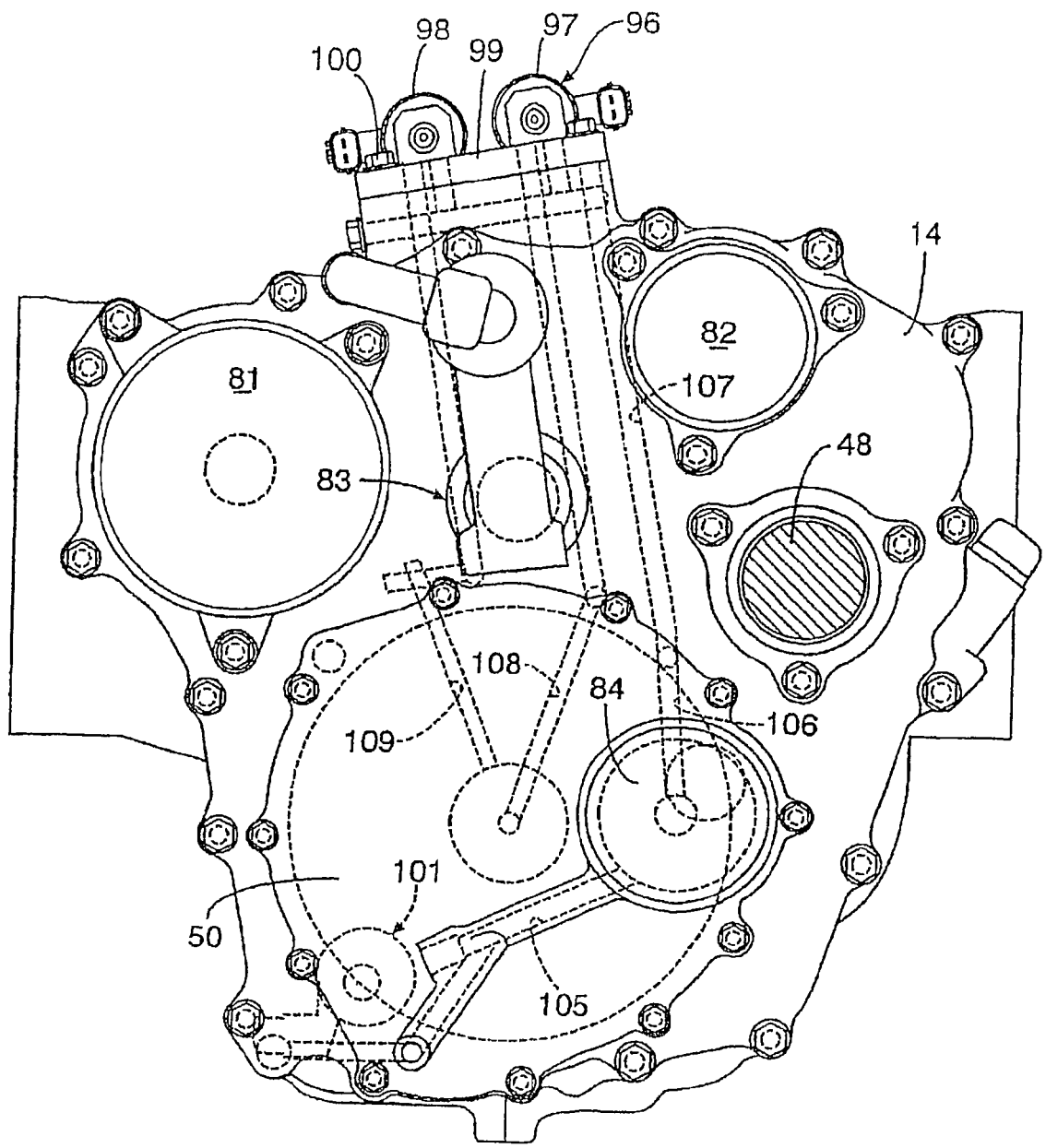
FIG. 9 is a view taken along arrow 9 of FIG. 4.

In FIG. 9, the clutch cover 50 is attached to the outside surface of the rear case 14. In addition, a generator 81 disposed on the left upper side of the clutch cover 50 as viewed from a person facing forwards in the running direction of the motorcycle, a starter motor 82 disposed on the right upper side of the clutch cover 50 and a cooling water pump 83 disposed on the upper side of the clutch cover 50 are attached to the outside surface of the rear case 14. Further, an oil filter 84 is attached to the clutch cover 50.

Paying attention to FIG. 8, first, second and third partition wall members 87, 88, 89 are attached to the inner surface side of the clutch cover 50. A first tube member 91 forming a first oil passage 90 communicating with the first oil pressure chamber 68 of the first clutch 36 is provided between the second main shaft 39 and the first partition wall member 87. A second tube member 93 coaxially surrounding the first tube member 91 so as to form, between itself and the first tube member 91, an annular second oil passage 92 communicating with the second canceller chamber 80 of the second clutch 37 is provided between the second main shaft 39 and the second partition wall member 88. A third tube member 95 coaxially surrounding the second tube member 93 so as to form, between itself and the second tube member 93, an annular second oil passage 94 communicating with the second oil pressure chamber 78 is provided between the second main shaft 39 and the third partition wall member 89.

The first and second oil passages 90, 94 are connected to a clutch actuator 96. The oil pressures in the first and second oil passages 90, 94, namely, in the first and second oil pressure chambers 68, 78 are controlled by the clutch actuator 96, whereby the engaged condition and disengaged condition of the first and second clutches 36, 37 are controlled in a switching manner.

The clutch actuator 96 is composed of a first solenoid control valve 97 for switching the action and release of an oil pressure on and from the first oil pressure chamber 68 in the first clutch 36, and a second solenoid control valve 98 for switching the action and release of an oil pressure on and from the second oil pressure chamber 78 in the second clutch 37. A support plate 99 provided in common for the first and second solenoid valves 97, 98 is attached to the upper surface of the rear case 14 by a plurality of bolts 100 . . . , instead of being provided ranging over both the crankcase 21 and the rear case 14. Moreover, as clearly shown in FIG. 4, the clutch actuator 96 is disposed at an upper part of the rear case 14 at a position for avoiding the intake system 28 connected to side walls of upper parts of the left and right cylinder heads 13L, 13R. In this embodiment, the clutch actuator 96 is disposed on the rear side of the intake system 28 so as not to overlap with the intake system 28 in plan view.

Figure 5:
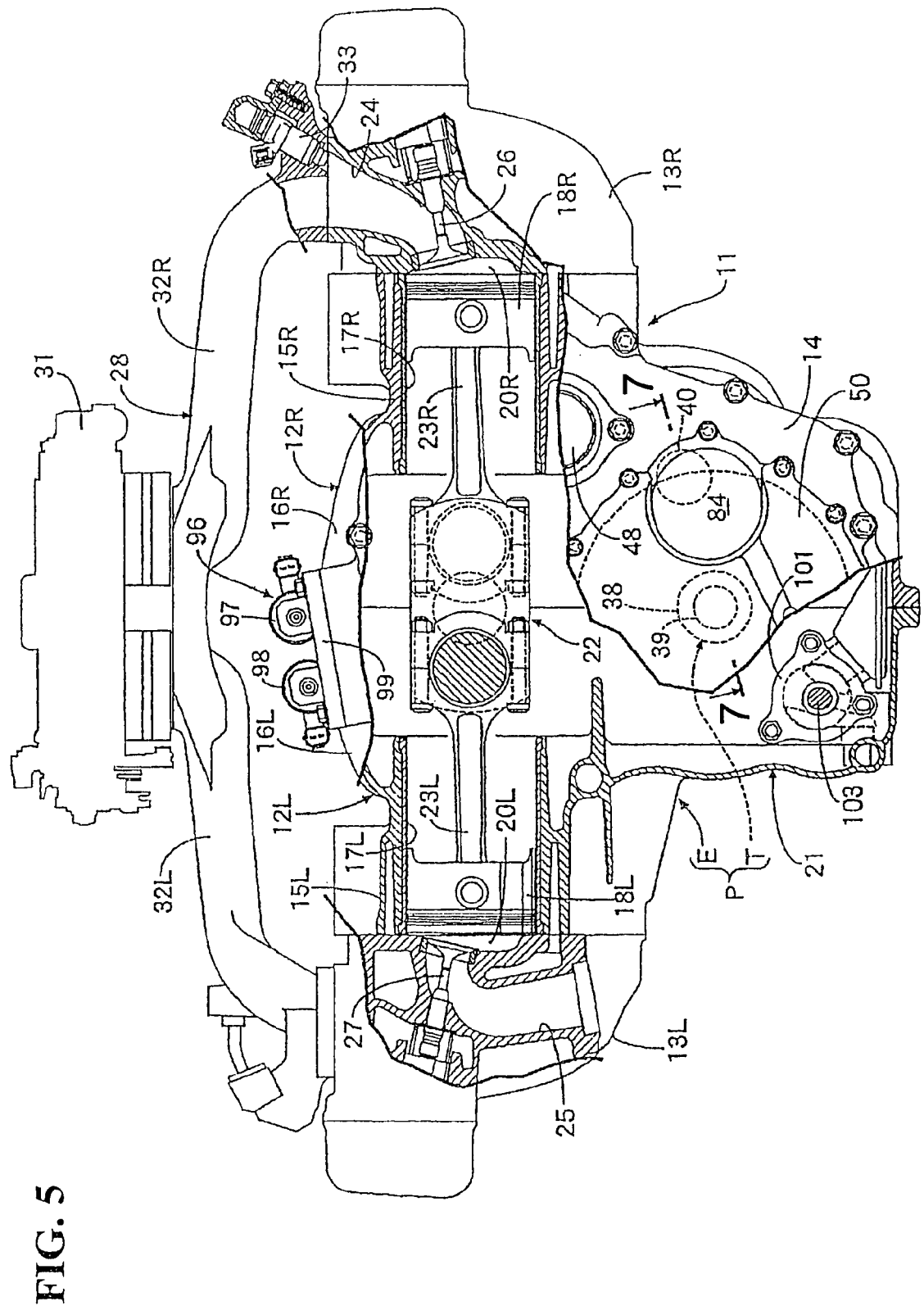
FIG. 5 is a partly cut-out sectional view taken along line 5-5 of FIG. 4.
Figure 6:
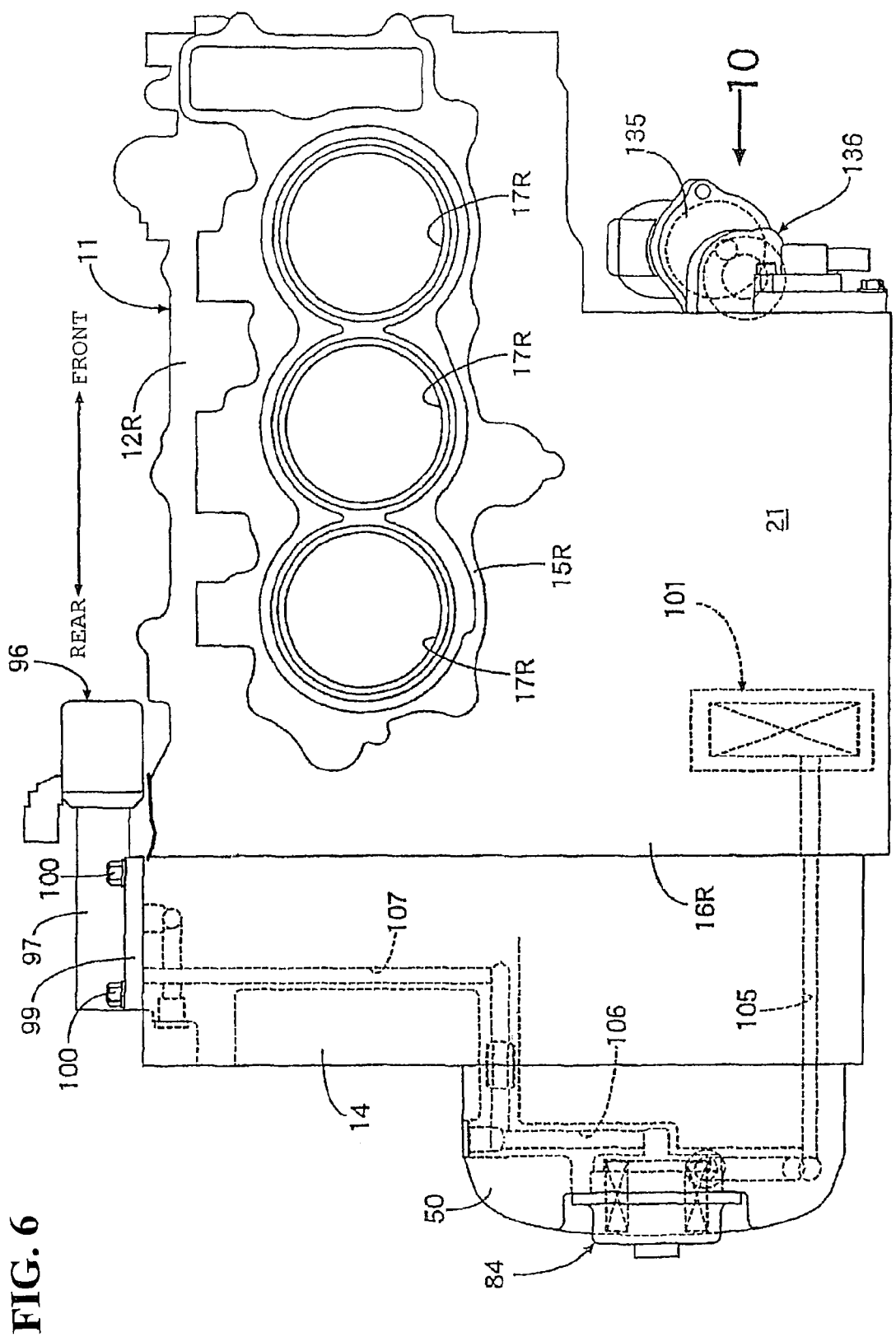
FIG. 6 is a view taken along line 6-6 of FIG. 5.

Paying attention to FIG. 5, an oil pump 101 is contained in a lower part of the inside of the crankcase 21. Power is transmitted to the oil pump 101 by a drive sprocket 102 (see FIG. 7) provided as one body with the transmission tubular shaft 57 to which the power from the crankshaft 22 is transmitted through the primary reduction gear 53, a driven sprocket (not shown) provided on a pump shaft 103 of the oil pump 101, and an endless chain 104 wrapped around the drive sprocket 102 and the driven sprocket.

An oil discharged from the oil pump 101 is led through the crankcase 21, the rear case 14 and a third oil passage 105 provided in the clutch cover 50 to an oil filter 84. The oil cleaned by the oil filter 84 is led through a fourth oil passage 106 formed in the clutch cover 50 and through a fifth oil passage 107 provided in the rear case 14 so as to communicate with the fourth oil passage 106, to the sides of the first and second solenoid control valves 97, 98.

In addition, a sixth oil passage 108 for connection between the first oil passage 90, which communicates with the first oil pressure chamber 68 of the first clutch 36, and the first solenoid control valve 97 is provided in the rear case 14 and the clutch cover 50. Besides, a seventh oil passage 109 for connection between the second oil passage 94, which communicates with the second oil pressure chamber 78 of the second clutch 37, and the second solenoid control valve 98 is provided in the rear case 14 and the clutch cover 50.

Again in FIG. 7, the 6th-speed gear train G6, the 4th-speed gear train G4 and the 2nd-speed gear train G2 are sequentially arranged between the first main shaft 38 and the counter shaft 40, in this order from the side of the first and second clutches 36, 37. The 6th-speed gear train G6 is composed of a 6th-speed drive gear 111 relatively rotatably borne on the first main shaft 38, and a 6th-speed driven gear 112 provided as one body with the counter shaft 40 and meshed with the 6th-speed drive gear 111. The 4th-speed gear train G4 is composed of a 4th-speed drive gear 113 relatively non-rotatably borne on the first main shaft 38 so as to be capable of moving in the axial direction, and a 4th-speed driven gear 114 relatively rotatably borne on the counter shaft 40 and meshed with the 4th-speed drive gear 113. The 2nd-speed gear train G2 is composed of a 2nd-speed drive gear 115 relatively rotatably borne on the first main shaft 38, and a 2nd-speed driven gear 116 relatively non-rotatably borne on the counter shaft 40 so as to be capable of moving in the axial direction and meshed with the 2nd-speed drive gear 115.

The 3rd-speed gear train G2, the 5th-speed gear train G5 and the 1st-speed gear train G1 are sequentially arranged between a part, protruding from one end part of the first main shaft 38, of the second main shaft 39 and the counter shaft 40, in this order from the side of the first and second clutches 36, 37. The 3rd-speed gear train G3 is composed of a 3rd-speed drive gear 117 relatively non-rotatably borne on the second main shaft 39 so as to be capable of moving in the axial direction, and a 3rd-speed driven gear 118 relatively rotatably borne on the counter shaft 40 and meshed with the 3rd-speed drive shaft 117. The 5th-speed gear train G5 is composed of a 5th-speed drive gear 119 relatively rotatably borne on the second main shaft 39, and a 5th-speed driven gear 120 relatively non-rotatably borne on the counter shaft 40 so as to be capable of moving in the axial direction and meshed with the 5th-speed drive gear 119. The 1st-speed gear train G1 is composed of a 1st-speed drive gear 121 relatively non-rotatably joined to the second main shaft 39, and a 1st-speed driven gear 122 relatively rotatably borne on the counter shaft 40 and meshed with the 1st-speed drive gear 121.

A first shifter 123 capable of changeover among a condition of being engaged with the 6th-speed drive gear 111, a condition of being engaged with the 2nd-speed drive gear 115 and a condition of being engaged with neither of the 6th-speed drive gear 111 and the 2nd-speed drive gear 115 is relatively non-rotatably and axially movably borne on the first main shaft 38 between the 6th-speed drive gear 111 and the 2nd-speed drive gear 115, and the first shifter 123 is integrally provided with the 4th-speed drive gear 113. In addition, a second shifter 124 capable of changeover between engagement and disengagement in relation to the 5th-speed drive gear 119 is relatively non-rotatably and axially movably borne on the second main shaft 39 between the 2nd-speed drive gear 115 and the 5th-speed drive gear 119, and the second shifter 124 is integrally provided with the 3rd-speed drive gear 117.

A third shifter 125 capable of changeover between engagement and disengagement in relation to the 4th-speed driven gear 114 is relatively non-rotatably and axially movably borne on the counter shaft 40 between the 4th-speed drive gear 114 and the 3rd-speed driven gear 118, and the third shifter 125 is integrally provided with the 2nd-speed driven gear 116. Besides, a fourth shifter 126 capable of changeover among a condition of being engaged with the 3rd-speed driven gear 118, a condition of being engaged with the 1st-speed driven gear 122 and a condition of being engaged with neither of the 3rd-speed driven gear 118 and the 1st-speed driven gear 122 is relatively non-rotatably and axially movably borne on the counter shaft 40 between the 3rd-speed driven gear 118 and the 1st-speed driven gear 122, and the fourth shifter 126 is integrally provided with the 5th-speed driven gear 120.

The 1st-speed gear train G1 is established by engaging the fourth shifter 126 with the 1st-speed driven gear 122; the 2nd-speed gear train G2 is established by engaging the first shifter 123 with the 2nd-speed drive gear 115 in the condition where the third shifter 125 is not engaged with the 4th-speed driven gear 114; the 3rd-speed gear train G3 is established by engaging the fourth shifter 126 with the 3rd-speed driven gear 118 in the condition where the second shifter 124 is not engaged with the 5th-speed drive gear 119; the 4th-speed gear train G4 is established by engaging the third shifter 125 with the 4th-speed driven gear 114 in the condition where the first shifter 123 is not engaged with the 6th-speed and 2nd-speed drive gear 115; the 5th-speed gear train G5 is established by engaging the second shifter 124 with the 5th-speed drive gear 119 in the condition where the fourth shifter 126 is not engaged with the 1st-speed and 3rd-speed driven gear 118; and the 6th-speed gear train G6 is established by engaging the first shifter 123 with the 6th-speed drive gear 111.

The first to fourth shifters 123 to 126 are rotatably held by first to fourth shift forks 127, 128, 129, 130. When the shift forks 127 to 130 are driven in the axial direction of both the main shafts 38, 39 and the counter shaft 40, the first to fourth shifters 123 to 126 are operated in the axial direction.

Figure 10:
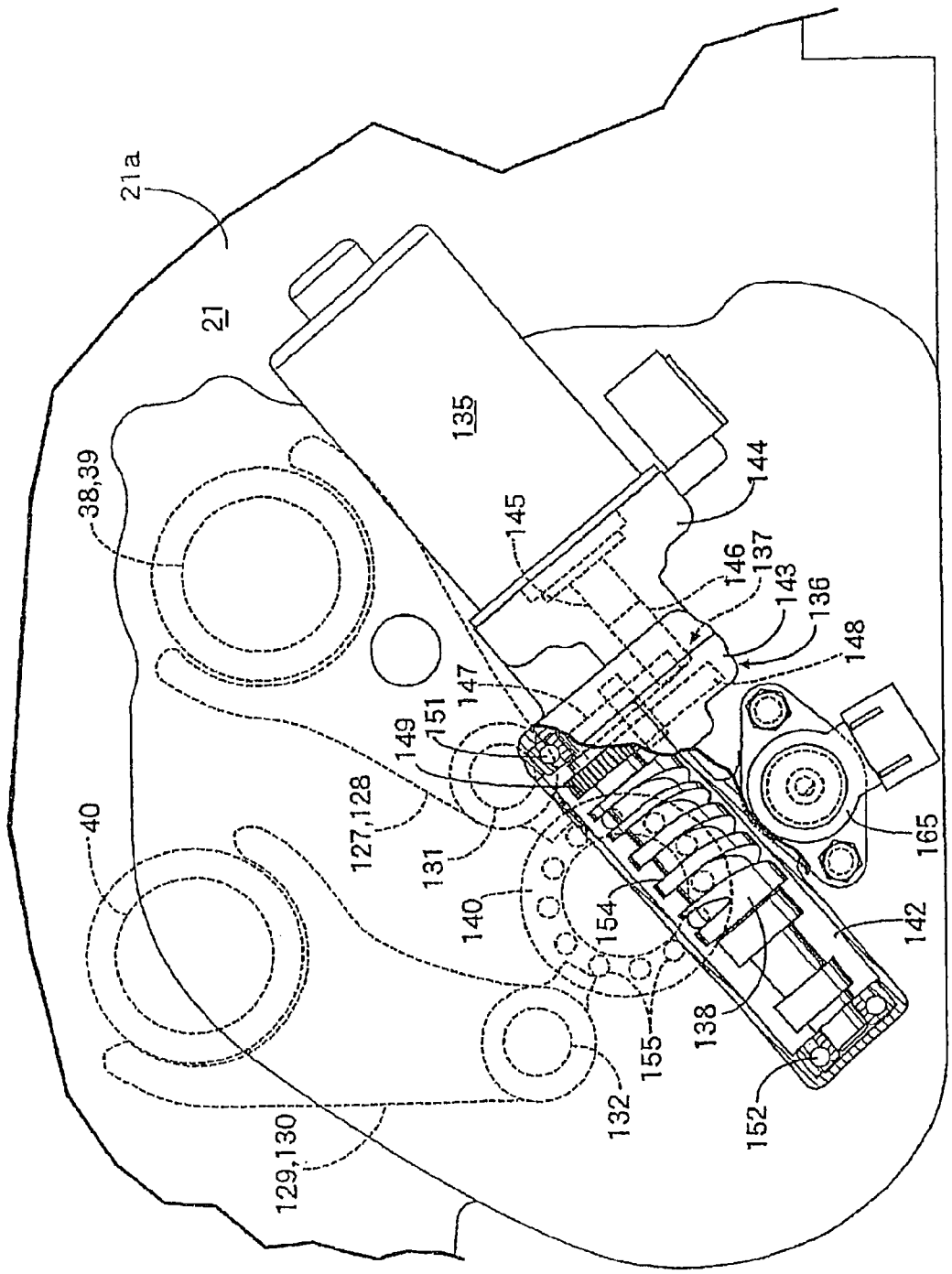
FIG. 10 is a view taken along arrow 10 of FIG. 6.
Figure 11:
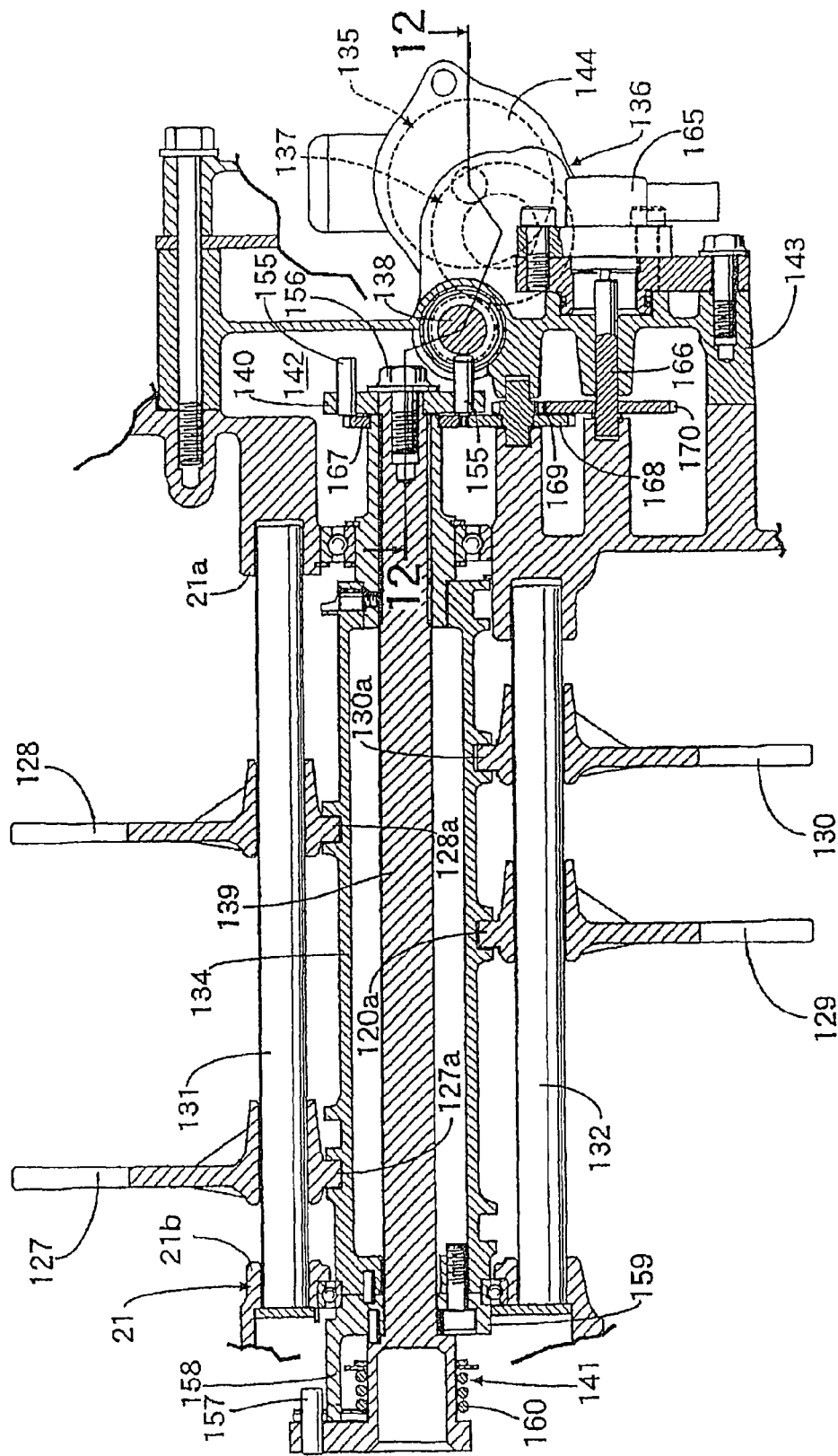
FIG. 11 is a longitudinal sectional view showing the configuration of a speed change actuator.
Figure 12:
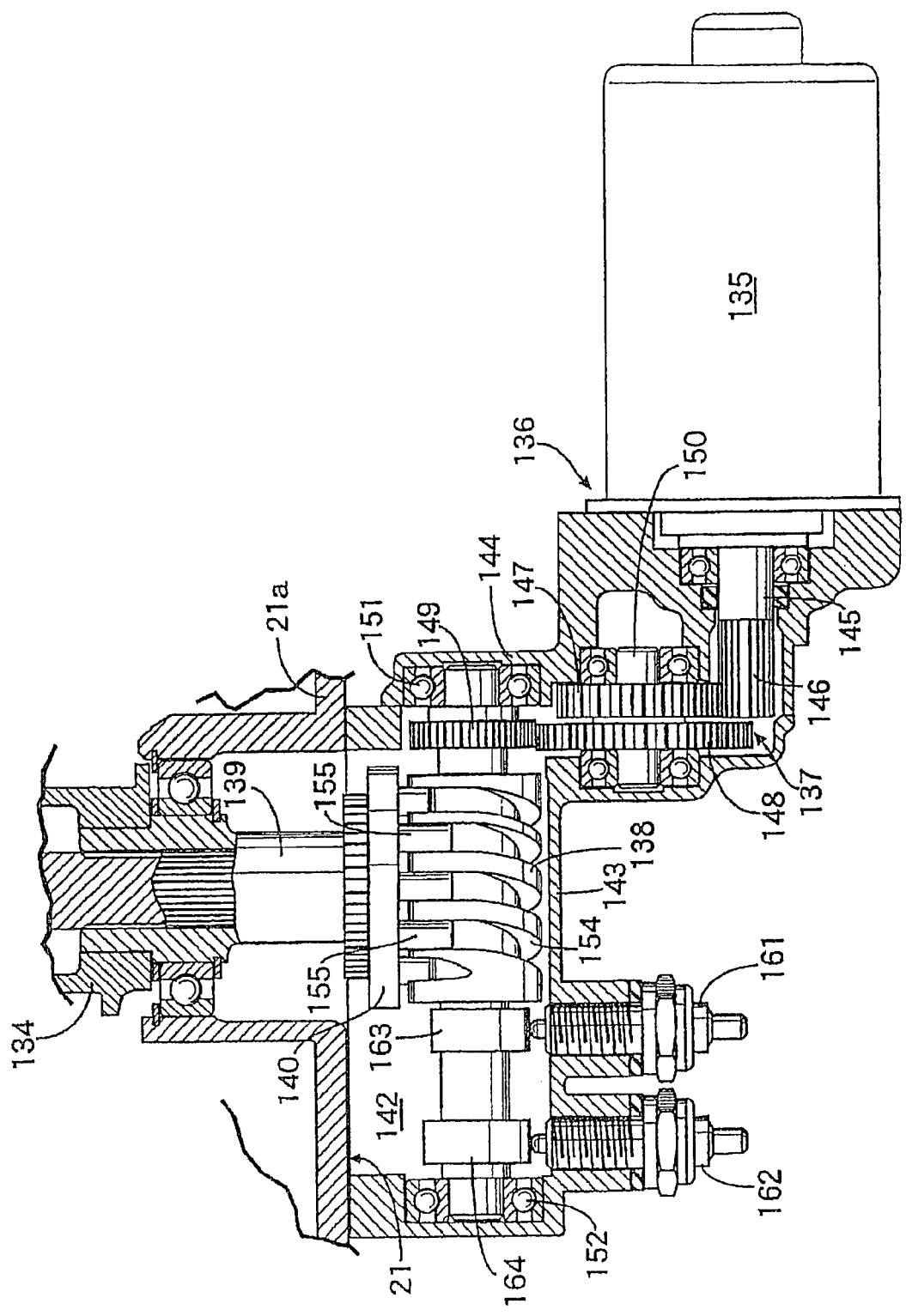
FIG. 12 is a sectional view taken along line 12-12 of FIG. 11.

In FIGS. 10 to 12, the first to fourth shift forks 127 to 130 are slidably borne on shift shafts 131, 132 which are supported on the crankcase 21 at both end parts thereof while having their axes parallel to the axis of the crankshaft 22. In addition, pins 127a, 128a, 129a, 130a provided on the shift forks 127 to 130 are engaged with the outer periphery of a shift drum 134 rotatably borne on the crankcase 21, and the shift forks 127 to 130 are slid according to the turning of the shift drum 134.

The shift drum 134 is driven to turn by a speed change actuator 136 having an electric motor 135. The speed change actuator 136 is disposed at a front surface of the engine body 11 as viewed along the running direction of the motorcycle; in this embodiment, it is disposed at a front surface of the crankcase 21. Moreover, as shown in FIG. 3, the speed change actuator 136 is located within the bank angle α on the lower side relative to tip parts of the steps 193L, 193R, so that the speed change actuator 136 can be disposed at the front surface of the crankcase 21 in such a manner as not to influence the bank angle α of the motorcycle.

The speed change actuator 136 includes the electric motor 135, a reduction gear mechanism 137 for reducing the speed of the output of the electric motor 135, a barrel cam 138 to which the output of the electric motor 135 reduced in speed by the reduction gear mechanism 137 is transmitted, a transmission shaft 139 coaxially and relatively rotatably penetrating the shift drum 134, a transmission rotary member 140 fixed to one end of the transmission shaft 139 so as to turn according to the rotation of the barrel cam 138, and a lost motion mechanism 141 provided between the other end of the transmission shaft 139 and the shift drum 134.

A case member 143 for forming an operation chamber 142 accommodating the reduction mechanism 137, the barrel cam 138 and the transmission rotary member 140 between itself and the front side wall 21a of the crankcase 21 is fastened to the outside surface of the front side wall 21a. A cover member 144 is attached to the case member 143 so as to close an open end of the case member 143, and the electric motor 135 is attached to the cover member 144 so as to project a motor shaft 145 into the operation chamber 142.

The gear speed change mechanism 137 is composed of a drive gear provided on the motor shaft 145 of the electric motor 135, a first intermediate gear 147 meshed with the drive gear 146, a second intermediate gear 148 rotated together with the first intermediate gear 147, and a driven gear 149 provided on the barrel cam 138 and meshed with the second intermediate gear 148.

The first and second intermediate gears 147, 148 are provided on a rotating shaft 150 rotatably borne at both end parts thereof by the case member 143 and the cover member 144, and both end parts of the barrel cam 138 are rotatably borne on the case member 143 and the cover member 144 through ball bearings 151, 152.

The outer periphery of the barrel cam 138 is provided with a spiral cam groove 154. On the other hand, the transmission rotary member 140 is disposed opposite to the outer periphery of the barrel cam 138 so that it can be rotated about the same axis as the shift drum 134. The transmission rotary member 140 is provided with a plurality of engaging pins 155, 155 . . . which are spaced at regular intervals in the circumferential direction and which can selectively be engaged with the cam groove 154. According to the rotation of the barrel cam 138, the plurality of engaging pins 155, 155 . . . are sequentially engaged with the cam groove 154 and fed, whereby rotational power is transmitted to the transmission rotary member 140.

One end part of the transmission shaft 139 coaxially and relatively rotatably penetrating the shift drum 134 is coaxially and relatively non-rotatably connected to the transmission rotary member 140 by a bolt 156, and the lost motion mechanism 141 is provided between the other end part of the transmission shaft 139 and the other end part of the shift drum 134.

The lost motion mechanism 141 includes: a pin 157 provided on the other end side of the transmission shaft 139, with an offset from the rotational axis of the transmission shaft 139; a transmission member 159 fastened to the other end of the shift drum 134 and provided with a transmission projection 158 disposed on the inner side of the pin 157, with an offset from the axis of the shift drum 134; and a snap spring 160 mounted onto the transmission shaft 139. The pin 157 and the transmission projection 158 are disposed between both ends of the snap spring 160.

When the transmission shaft 139 is turned to thereby cause the pin 157 to push the one end side of the snap spring 160 in a turning direction, the other end of the snap spring 160 pushes the transmission projection 158, so that the turning force due to the turning of the transmission shaft 139 is transmitted to the shift drum 134 through the lost motion mechanism 141 which produces a play.

Meanwhile, the speed change actuator 136 is so configured as to turningly drive the shift drum 134 to change the speed change stage by one stage, in response to one revolution of the barrel cam 138. In order to check whether or not the barrel cam 138 is rotated correctly by the operation of the electric motor 135, first and second switches 161 and 162 are attached to the case member 143.

As shown in FIG. 12, the barrel cam 138 is provided, at its part corresponding to the first switch 161, with a first switch cam 163 for turning ON the first switch 161 by contacting the first switch 161. Also, the barrel cam 138 is provided, at its part corresponding to the second switch 162, with a second switch cam 164 for turning ON the second switch 162 by contacting the second switch 162.

The first and second switch cams 163, 164 are provided in the barrel cam 138 in the state of having the same shape but being different in phase so that there exist a region in which both the switches 161 and 162 are turned ON, a region in which the first switch 161 is turned ON but the second switch 162 is turned OFF, a region in which the second switch 162 is turned ON but the first switch 161 is turned OFF, and both the switches 161 and 162 are turned OFF, according to the rotation of the barrel cam 138. Thus, the operating condition of the barrel cam 138 can be checked by detecting the ON/OFF states of the first and second switches 161, 162.

Further, a shift sensor 165 for detecting the turning position of the shift drum 134 is attached to the case member 143. A detection shaft 166 of the shift sensor 165 is rotatably borne by the front side wall 21a of the crankcase 21 and the case member 143.

A third intermediate gear 168 is meshed with a drive gear 167 rotated together with the shift drum 134, and a driven gear 170 provided on the detection shaft 166 is meshed with a fourth intermediate gear 169 rotated together with the third intermediate gear 168.

Now, the operation of the first embodiment will be described below. Since the clutch actuator 96 is disposed at the upper surface of the engine body 11, the clutch actuator 96 can be disposed by effectively utilizing the space on the upper side of the engine body 11 while obviating increases in the front-rear lengths of the engine body 11 and the vehicle body.

In addition, the clutch actuator 96 is disposed at the upper surface of the engine body 11 while avoiding the intake system 28, so that the space on the upper side of the engine body 11 can be utilized effectively. In addition, it is ensured that other component parts are not arranged in the vicinity of the clutch actuator 96, so that the running airflow during running of the vehicle will easily come into contact with the clutch actuator 96, and the performance of cooling the clutch actuator 96 can be enhanced.

Besides, the clutch actuator 96 is disposed on the rear case 14 which is connected to a rear part of the crankcase 21 so as to form, between itself and the clutch cover 50, the clutch chamber 51 for containing the first and second clutches 36, 37. Therefore, the distances between the first and second clutches 36, 37 and the clutch actuator 96 can be shortened, and the control force transmission paths from the clutch actuator 96 to the first and second clutches 36, 37 can be made compact. Moreover, since the clutch actuator 96 is provided only in the area of the rear case 14, instead of provided to range over both the crankcase 21 and the rear case 14, mounting of the clutch actuator 96 is facilitated.

Further, the speed change actuator 136 for controlling the speed change operation of the gear speed change mechanism 35 provided between the first and second clutches 36, 37 and the rear wheel WR is disposed at the front surface of the engine body 11, specifically at the front surface of the crankcase 21 in this embodiment. Therefore, the clutch actuator 96 and the speed change actuator 136 can be disposed by effectively utilizing the space in the surroundings of the engine body 11.

Figure 13:
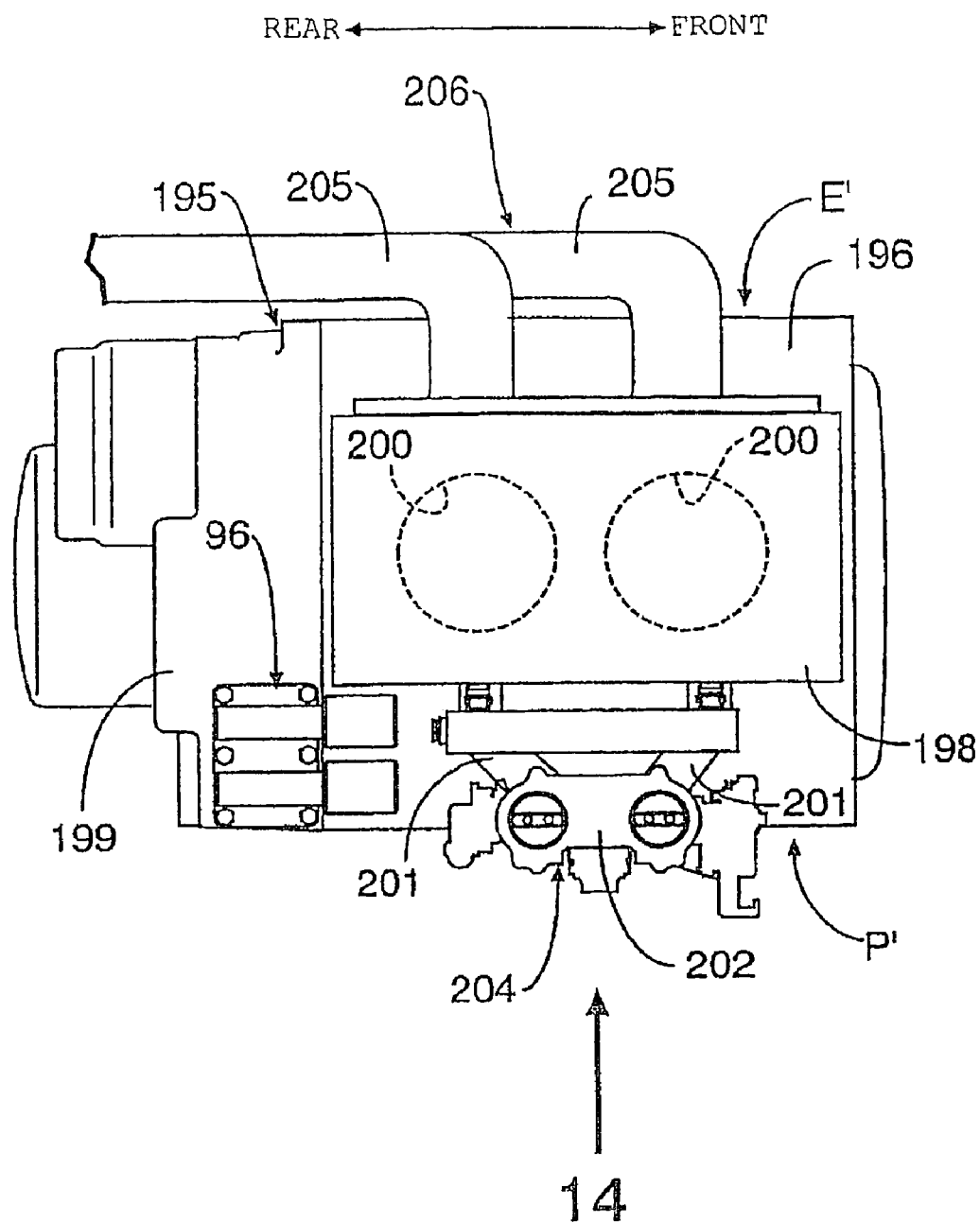
FIG. 13 is a simplified plan view of a power unit according to a second embodiment of the present invention.
Figure 14:
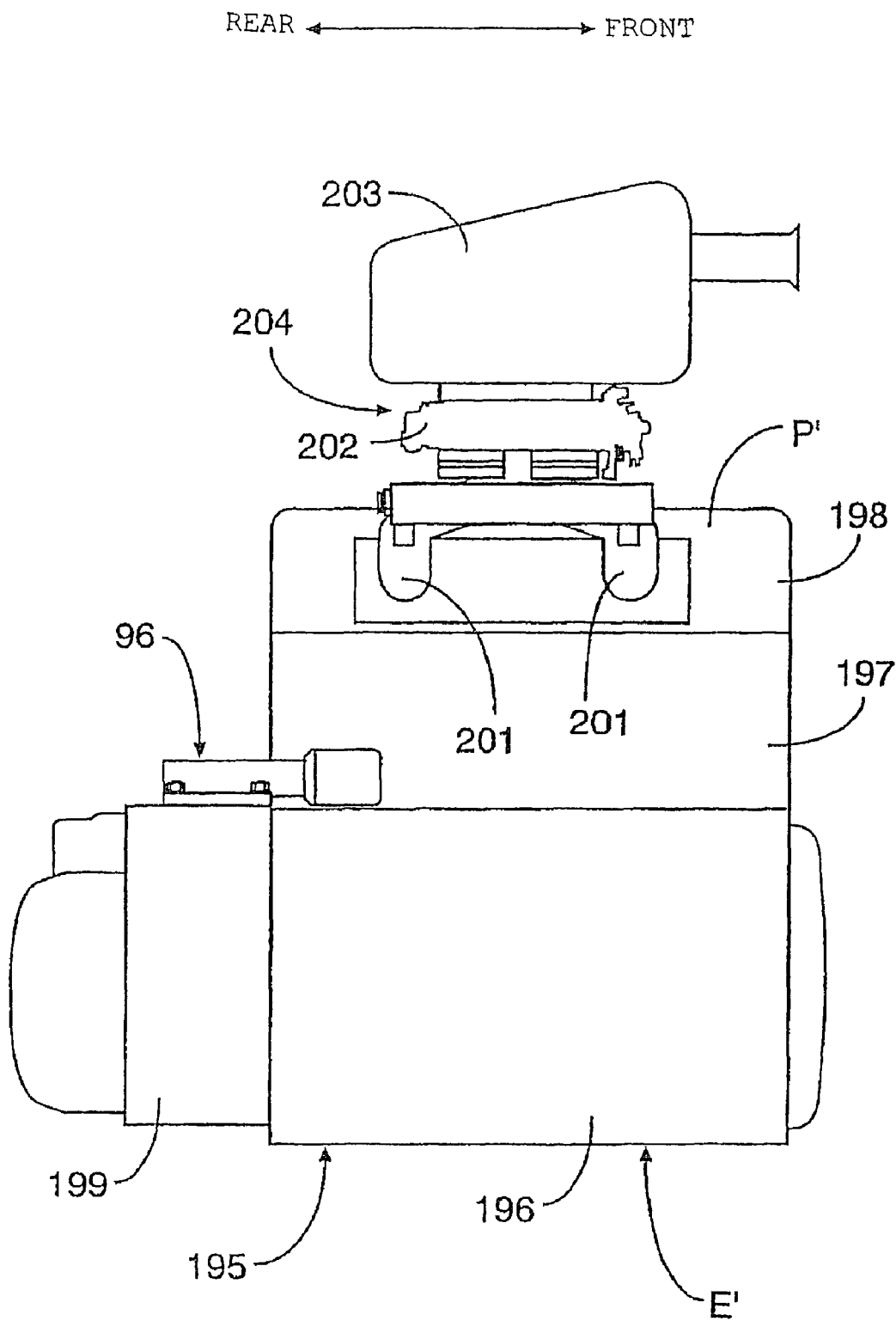
FIG. 14 is a view taken along arrow 14 of FIG. 13.

FIGS. 13 and 14 show a second embodiment of the present invention, in which FIG. 13 is a simplified plan view of a power unit, and FIG. 14 is a view taken along arrow 14 of FIG. 13.

The power unit P' mounted on a motorcycle is composed of a multi-cylinder, for example, 2-cylinder engine E' and a transmission (not shown) for transmitting the power of the engine E' with speed change. An engine body 195 of the engine E' includes a crankcase 196, a cylinder block 197 which has a plurality of, for example, two cylinder bores 200, 200 arrayed in the front-rear direction of the vehicle with cylinder axes set vertical and which is connected to an upper part of the crankcase 196, a cylinder head 198 connected to an upper part of the cylinder block 197, and a rear case 199 connected to a rear part of the crankcase 196 as viewed along the front-rear direction of the motorcycle. A crankshaft (not shown) is rotatably borne on the crankcase 196 while having its axis set along the front-rear direction of the motorcycle.

An intake system 204 having individual intake pipes 201, 201 corresponding respectively to the cylinders, a throttle body 202 connected in common to the individual intake pipes 201 . . . and an air cleaner 203 connected to the throttle body 202 is connected to a right side surface of the cylinder head 198 as viewed from a person facing in the running direction of the motorcycle, whereas an exhaust system 206 having individual exhaust pipes 205, 205 corresponding respectively to the cylinders is connected to a left side surface of the cylinder head 198 as viewed from a person facing the running direction of the motorcycle.

A clutch actuator 96 is attached to an upper surface of the engine body 195, specifically to an upper surface of the rear case 199 in this second embodiment. Moreover, the clutch actuator 96 is disposed at a position for avoiding the intake system 204 connected to the cylinder head 198 of the engine body 195.

According to the second embodiment, also, the same effects as those in obtained in the first embodiment can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

For example, the rear case can be formed as one body with the crankcase; in that case, the need for a rear case as a body separate from the crankcase is eliminated, so that the number of component parts can be reduced.

What is claimed is:

1. A power unit for a vehicle, comprising:
an engine body having a crankcase;
a crankshaft rotatably supported by said crankcase and having an axis that is set along a front-rear direction of said vehicle;
a power transmission path for transmitting a rotational drive force of said crankshaft to a drive wheel;
a clutch provided in said power transmission path for switching connection and disconnection of the transmission of power; and
a clutch actuator mounted on said engine body for controlling the switching between an engaged condition and disengaged condition of said clutch,
wherein said clutch actuator is disposed at an upper surface of said engine body,
wherein said clutch is contained in a clutch chamber defined by both a rear case, which is a part of said engine body and is connected to a rear part of said crankcase, and a clutch cover connected to said rear case, and
wherein said clutch actuator is disposed at an upper surface of said rear case in a position forward relative to the clutch cover.

2. The power unit for the vehicle as set forth in claim 1, wherein said clutch actuator is disposed at a position for avoiding an intake system connected to said engine body.

3. The power unit for the vehicle as set forth in claim 1, wherein and
since said clutch actuator is disposed at said upper surface of said rear case, an increase in front-rear lengths of the engine body and the vehicle can be avoided.

4. The power unit for the vehicle as set forth in claim 1, wherein and
since said clutch actuator is disposed at said upper surface of said rear case, running airflow during running of the vehicle easily comes in contact with the clutch actuator, and cooling performance of the clutch actuator is ensured.

5. The power unit for the vehicle as set forth in claim 1, further comprising a speed change actuator for controlling a speed change operation of a gear speed change mechanism and constituting a part of a transmission, wherein the speed change actuator is provided between said clutch and said drive wheel is disposed at a lower portion of a front surface of said engine body.

6. The power unit for the vehicle as set forth in claim 1, further comprising a speed change actuator for controlling a speed change operation of a gear speed change mechanism and constituting a part of a transmission, wherein the speed change actuator
is provided between said clutch and said drive wheel is disposed at a lower portion of a front surface of said engine body in a position under a forward end of the crankshaft.

7. The power unit for the vehicle as set forth in claim 2, further comprising a speed change actuator for controlling a speed change operation of a gear speed change mechanism and constituting a part of a transmission, wherein the speed change actuator is provided between said clutch and said drive wheel is disposed at a lower portion of a front facing surface of said engine body.

8. The power unit for the vehicle as set forth in claim 1, wherein said engine body includes horizontally opposed cylinder bores.

9. The power unit for the vehicle as set forth in claim 2, wherein said intake system includes a plurality of individual intake pipes connected to said engine body at downstream ends thereof in a state of communicating respectively with a plurality of intake ports provided in said engine body, and a throttle body to which upstream ends of said individual intake pipes are connected in common.

10. A power unit for a vehicle, comprising:
an engine body having a crankcase;
a crankshaft rotatably supported by said crankcase and having an axis that is set along a front-rear direction of said vehicle;
a power transmission path for transmitting a rotational drive force of said crankshaft to a drive wheel;
a clutch provided in said power transmission path for switching connection and disconnection of the transmission of power; and
a clutch actuator mounted on said engine body for controlling the switching between an engaged condition and disengaged condition of said clutch,
wherein said clutch actuator is disposed at an upper surface of said engine body in a position that is offset in a horizontal direction with respect to an axis of the crankshaft, and
further comprising a speed change actuator provided between said clutch and said drive wheel for controlling a speed change operation of a gear speed change mechanism, the gear speed change mechanism and constituting a part of a transmission,
wherein the speed change actuator is provided between said clutch and said drive wheel is disposed at a lower portion of a front facing surface of said engine body.

11. The power unit for the vehicle as set forth in claim 10, wherein said clutch actuator is disposed at a position for avoiding an intake system connected to said engine body.

12. The power unit for the vehicle as set forth in claim 10, wherein said clutch is contained in a clutch chamber defined by both a rear case, which is a part of said engine body and is connected to a rear part of said crankcase, and a clutch cover connected to said rear case, and
wherein said clutch actuator is disposed at an upper surface of said rear case in a position forward relative to the clutch cover.

13. The power unit for the vehicle as set forth in claim 10, wherein said engine body includes cylinder bores having vertical axes.

14. The power unit for the vehicle as set forth in claim 10, wherein the speed change actuator is disposed in a position which is under a forward end of the crankshaft.

15. The power unit for the vehicle as set forth in claim 10, wherein said engine body includes horizontally opposed cylinder bores.

16. The power unit for the vehicle as set forth in claim 11, wherein said intake system includes a plurality of individual intake pipes connected to said engine body at downstream ends thereof in a state of communicating respectively with a plurality of intake ports provided in said engine body, and a throttle body to which upstream ends of said individual intake pipes are connected in common.

17. A power unit for a vehicle, comprising:
an engine body having a crankcase;
a crankshaft rotatably supported by said crankcase and having an axis that is set along a front-rear direction of said vehicle;
a power transmission path for transmitting a rotational drive force of said crankshaft to a drive wheel;
a clutch provided in said power transmission path for switching connection and disconnection of the transmission of power; and
a clutch actuator mounted on said engine body for controlling the switching between an engaged condition and disengaged condition of said clutch,
wherein said clutch actuator is disposed above the crankshaft on a portion of an upper surface of said engine body that is tilted toward one side of the vehicle, and
further comprising a speed change actuator constituting a part of a transmission,
wherein the speed change actuator is disposed at a lower portion of a front facing surface of said engine body in a position which is under a forward end of the crankshaft.

18. The power unit for the vehicle as set forth in claim 17, wherein said clutch actuator is disposed at a position for avoiding an intake system connected to said engine body, which allows running airflow during running of the vehicle to easily come in contact with the clutch actuator, and cooling performance of the clutch actuator is ensured.

19. The power unit for the vehicle as set forth in claim 17, wherein said clutch is contained in a clutch chamber defined by both a rear case, which is a part of said engine body and is connected to a rear part of said crankcase, and a clutch cover connected to said rear case, and
wherein said clutch actuator is disposed at an upper surface of said rear case in a position forward relative to the clutch cover, which allows running airflow during running of the vehicle to easily come in contact with the clutch actuator, and cooling performance of the clutch actuator is ensured.

20. The power unit for the vehicle as set forth in claim 17, wherein said engine body includes horizontally opposed cylinder bores.

* * * * *